Oct. 24, 1939.　　　　E. E. HEWITT　　　　2,177,527
TRAIN BRAKING SYSTEM
Filed Feb. 13, 1935　　　3 Sheets-Sheet 3

INVENTOR
ELLIS E. HEWITT
BY Wm. M. Cady
ATTORNEY

Patented Oct. 24, 1939

2,177,527

UNITED STATES PATENT OFFICE 2,177,527

TRAIN BRAKING SYSTEM

Ellis E. Hewitt, Edgewood, Pa., assignor to The Westinghouse Air Brake Company, Wilmerding, Pa., a corporation of Pennsylvania Application February 13, 1935, Serial No. 6,360

18 Claims. (Cl. 303—24)

This invention relates to a train braking system, and in particular to a train braking system of the type employing means for preventing the maximum rate of retardation produced by an application of the brakes from exceeding a chosen value.

The maximum braking force which may be applied to the wheels of a railway vehicle is limited by the adhesion between the vehicle wheels and track rails. If too great a braking force is applied, the wheels may be caused to slide even at fairly high speeds. Again, if the initial braking force is below that which will cause the wheels to slide at high speeds, the wheels still may slide as the speed of the vehicle decreases, if friction type brakes are employed, because the coefficient of friction between the rubbing parts of a friction brake increases as the speed of the vehicle decreases, and as a consequence the braking effect on the wheels increases. If initially high, therefore, the braking force must be decreased as the speed of the vehicle decreases, if sliding of the wheels is to be prevented.

There have heretofore been proposed a number of devices, commonly referred to as retardation controller devices, for reducing the braking force as the speed of the vehicle diminishes. These devices employ an element operated according to the rate of retardation, and equipments having these devices employ means responsive to operation of this element at some chosen rate of retardation for releasing the brakes until the rate of retardation will have dropped below this chosen value.

As far as I am aware, most of the means which operate responsively to this element depend upon the sequential operation of certain parts. If one of the parts in the sequence should fail to operate, then the releasing action of the brakes will not take place. It would therefore be highly desirable if the means responsive to operation of the inertia element comprise dual mechanisms, each of which would be operable to effect a release of the brakes independently of the other, so that if one mechanism should be inoperative, the other would be operative to effect the release.

It is a principal object of the present invention to provide a brake system in which the maximum degree of braking is positively limited to that which will not produce a rate of retardation substantially exceeding a chosen value.

It is a further object of the invention to provide a brake system employing a retardation controller device in which both pneumatic and electrical means are employed to operate responsively to operation of the retardation controller device to prevent the rate of retardation due to braking from exceeding a chosen maximum value.

A still further object of the invention is to provide a brake system of the character just referred to in which indicating means are provided for indicating operation of the electrical means referred to.

A yet further object of the invention is to provide a brake system embodying a novel and improved arrangement of parts for accomplishing the above set forth objects.

Other objects and advantages of the invention will appear more fully from the description which follows, which has been taken in connection with the attached drawings, wherein, Figure 1 is a view showing a schematic arrangement of apparatus comprising one embodiment of the invention, the parts being shown for only the head end car of a train.

Figure 1:
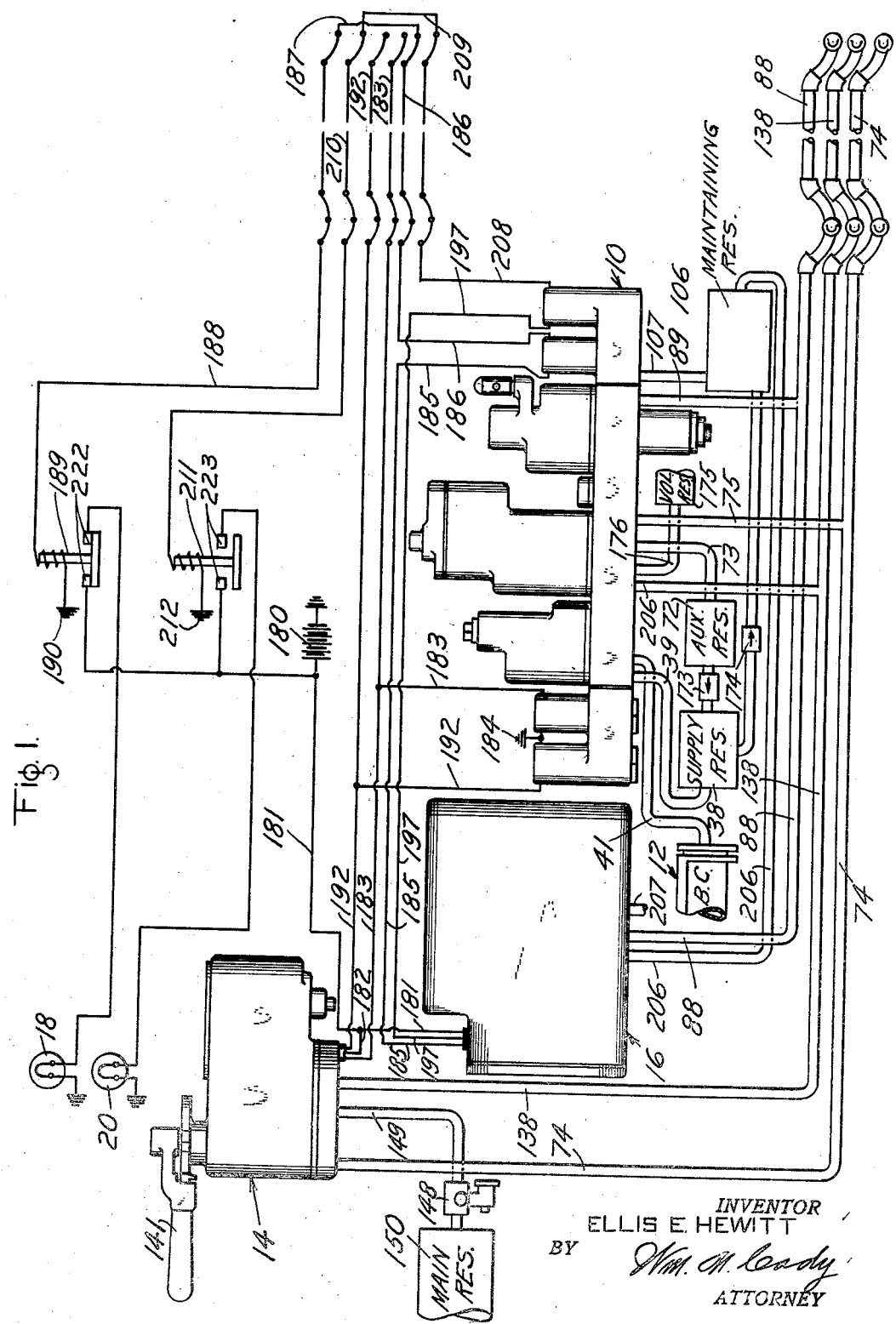

In Figure 1 sufficient apparatus has been shown only for the head end or control car, but it will be obvious from the following description, that by duplication of certain of the parts shown in Figure 1 on succeeding cars in the train, that the system applies for a train of any number of cars.

Considering briefly at first the schematic arrangement shown in Figure 1, there is provided a control valve device 10 for controlling the supply of fluid under pressure to and its release from one or more brake cylinders 12. For controlling all applications of the brakes, whether service or emergency applications, there is provided a brake valve device 14.

For preventing the rate of retardation produced by braking from exceeding a chosen maximum value, there is provided a retardation controller device 16. For indicating to the operator the functioning of certain electrical devices in response to operation of the retardation controller device 16, there are provided two indicating devices 18 and 20.

Considering now more in detail the parts above referred to, the control valve device 10 comprises a relay valve section 22, a left hand magnet valve section 24, a triple valve section 26, a pneumatic cut-off and release valve section 28, an inshot valve section 30, and a right hand magnet valve section 32. All of these sections are secured to a pipe bracket section 34.

The relay valve section 22 is embodied in a casing having disposed therein a valve 36 for controlling communication between a passage 37 connected to a supply reservoir 38, by way of pipe 39, and a chamber 40 connected to the brake cylinder or brake cylinders 12, by way of pipe and passage 41. The valve 36 is urged toward a seated position by a spring 42, and is adapted to be urged toward an unseated position by pressure exerted on a stem 43.

Disposed in the chamber 40 is a slide valve 45 for controlling communication between the chamber 40 and the atmosphere, by way of an exhaust port 46. For actuating the slide valve 45 and for exerting pressure on the valve stem 43 to unseat the valve 36, there is provided a piston 47 disposed in a piston chamber 48. The piston 47 is provided with a stem 49 having elements associated therewith adapted to engage the slide valve 45 after a lost motion movement of the piston. Integral with the stem 49 is a guiding piston 50, which slides in a bore 51 to guide the movement of the piston 47. The guiding piston 50 is apertured at 52 to provide communication between the chamber 40 and a chamber 53 above the piston 47.

The left hand magnet valve section 24 is provided with an application valve 56 and a release valve 57, which control, respectively, the supply of fluid under pressure to and its release from the relay piston chamber 48. The application valve 56 is urged toward seated position by a spring 58 and toward unseated position by action of an electromagnet in the upper part of the casing, which when energized actuates the valve downwardly. When the application valve is unseated, fluid under pressure may flow from a lower chamber 59, connected to a source of fluid under pressure, to an upper chamber 60 which leads to the relay piston chamber 48, as will appear more fully presently.

The release valve 57 is urged toward a seated position by a spring 61 and toward an unseated position by action of another electromagnet in the upper part of the casing, which when energized actuates the valve downwardly. When the application valve 56 is seated and the release valve 57 is unseated, fluid under pressure is released from the piston chamber 48 to the atmosphere by way of unrestricted exhaust port 62.

The triple valve section 26 is provided for also controlling the flow of fluid to the relay piston chamber 48, and is embodied in a casing having a slide valve chamber 63 and a piston chamber 64. Disposed in the slide valve chamber 63 is a main slide valve 65 and a graduating valve 66. Disposed in the piston chamber 64 is a piston 67 for operating the two slide valves.

The piston 67 is provided with a stem 68, which is recessed to receive the graduating slide valve 66 so as to move the graduating valve coextensive with movement of the piston 67, and which is also provided with a collar 70 adapted to engage the main slide valve 65 after a lost motion movement of the piston.

The slide valve chamber 63 is in constant communication with an auxiliary reservoir 72 by way of pipe and passage 73, while the piston chamber 64 is in communication with a brake pipe 74, by way of pipe and passage 75.

When a service reduction in brake pipe pressure is effected, the piston 67 moves upwardly until it engages a graduating stem 76 where it is arrested. When an emergency reduction in brake pipe pressure is effected, the piston 67 moves upwardly and compresses a graduating spring 77, which normally urges the graduating stem 76 downwardly.

The pneumatic cut-off and release valve section 28 is embodied in a casing provided with a slide valve chamber 80 and a piston chamber 81. Disposed in the slide valve chamber 80 is a main slide valve 82 and a graduating valve 83. Disposed in the piston chamber 81 is a piston 84 having a stem 85 recessed to receive the graduating valve 83, so as to move the graduating valve coextensive with movement of the piston 84, and also having elements associated therewith adapted to engage the main slide valve 82 after a lost motion movement of the piston 84.

The piston 84 is urged to an uppermost position by a spring 86, and is adapted to be actuated to a lower position upon a reduction of pressure in the piston chamber 81. The piston chamber 81 is connected to a control pipe 88 by way of pipe and passage 89.

The pneumatic cut-off and release valve section 28 controls communication from both the left hand magnet valve section 24 and the triple valve section 26 to the relay piston chamber 48, and also controls communication from the relay valve piston chamber 48 to the atmosphere, by way of a safety valve device 90. This safety valve device is preferably one of the types commonly employed in connection with fluid pressure brake apparatus, the function of which, as is well known in the art, is to prevent the release of fluid under pressure from the volume connected thereto below a predetermined value of pressure.

The inshot valve section 30 is embodied in a casing having a ball valve 92 disposed in a ball valve chamber 93 and adapted to control communication between the ball valve chamber and a passage 94. The ball valve 92 is urged toward an unseated position by engagement therewith of a stem 95 associated with a piston 96 disposed in a piston chamber 97. The piston 96 is urged upwardly to cause unseating of the ball valve 92 by a spring 98 disposed in a spring housing 99.

The right hand magnet valve section 32 is embodied in a casing provided with a supply valve 100 and a release valve 101. The supply valve 100 is adapted to control the supply of fluid under pressure by one communication to the pneumatic cut-off and release valve piston chamber 81 and the release valve 101 is adapted to release fluid under pressure from the piston chamber 81 regardless of how supplied to the piston chamber.

The supply valve 100 is urged toward seated position by a spring 102 and toward unseated position by action of an electromagnet in the upper part of the casing, which when energized actuates the supply valve downwardly. The release valve 101 is urged toward a seated position by another spring 103, and toward an unseated position by action of another electromagnet in the upper part of the casing, which when energized actuates the release valve downwardly.

When the supply valve 100 is unseated, a communication is established between a lower chamber 105, which is in communication with a maintaining reservoir 106 by way of pipe and passage 107, and an upper chamber 108, which leads to the piston chamber 81. When the supply valve 100 is seated, and the release valve 101 is unseated, this communication to the maintaining reservoir 106 is cut off and fluid under pressure is released from the piston chamber 81 to the atmosphere, by way of restricted exhaust port 109.

The brake valve device 14 is embodied in a casing having mounted therewithin and insulated therefrom a stationary release contact 112 and a stationary application contact 113. For engaging these two contacts, respectively, there are provided a movable release contact 114 and a movable application contact 115. The two movable contacts are carried on either end of an insulating and carrying member 116, which is pivotally mounted intermediate its ends at 117 to a plunger 118 having one end thereof slidably disposed in a bore 119 in the casing.

Two springs 120 and 122 act upon the carrying member 116, on either side of the pivot 117, to urge the two movable contacts 114 and 115 upwardly. When the carrying member 116 is thus urged upwardly, the movable release contact 114 engages the stationary release contact 112, while the end of the carrier 116 to which the movable application contact 115 is secured engages an adjustable stop 123.

When the plunger 118 is actuated downwardly, the spring 122, which is weaker than the spring 120, yields first, so that movable release contact 114 disengages from stationary release contact 112, and when the right end of the carrier 116 has been actuated downwardly far enough to engage a lug 124, the left end of the carrier 116 then compresses the spring 120 and movable application contact 115 then engages stationary application contact 113. The purpose of this operation of these contacts will appear more fully in the description of operation of this embodiment.

For actuating the plunger 118 downwardly, there is provided an actuating lever 126, which has its right end pivotally secured to the upper end of the plunger 118 at 127, and its left end terminating in a finger 128 bearing upon a cam 129 under pressure of a spring 130.

Intermediate its ends the actuating lever 126 is pivotally secured at 131 to a stem 132 associated with a piston 134 disposed in a piston chamber 135. The piston 134 is urged downwardly by a spring 136, which is to be understood as requiring greater force to compress it than required to compress the combination of the aforementioned two springs 120 and 122. Therefore, as the cam 129 is rotated and the finger end 128 of the actuating lever 126 raised, the lever will fulcrum about the pivot point 131 to disengage contact 114 from contact 112 and to engage contact 115 with contact 113, as before described.

The piston chamber 135 is in communication with a straight air pipe 138, and when fluid under pressure is supplied to the piston chamber from this pipe, the piston 134 will be moved upwardly to actuate the lever 126 about its left end 128 for a purpose and in a manner to be more fully described presently.

The cam 129 is secured to a shaft 140 which is rotatable by a handle 141 secured thereto and having a notching pin 142 adapted to engage notches in a quadrant ring 144.

Disposed in a rotary valve chamber 145 in a lower part of the brake valve device casing, and operable according to rotation of the aforementioned shaft 140, is a rotary valve 146. This valve is held upon its seat by a spring 147, and controls communications to be more fully described hereinafter.

The valve chamber 145 is in constant communication with a feed valve device 148, by way of pipe and passage 149. The feed valve device 148 is preferably of one of the types commonly employed, and, as is well known in the art, functions to maintain a predetermined pressure of the fluid supplied to the volumes connected therewith. The feed valve device is in turn connected to a main reservoir 150, which may have fluid supplied thereto under pressure by any of the compressor means commonly employed in the art.

The retardation controller device 16 is embodied in a casing having an inertia responsive body 152 slidable upon surfaces 153 and 154 in a linear pathway. The retardation controller device is positioned upon the head end or control car in a manner such that when the brakes are applied and the vehicle or train decelerates, the body 152 is actuated by the resulting force of inertia towards the left, as viewed in Figure 4.

When moving to the left, the body 152 engages a roller 155 secured to an upper bifurcated end of a lever 156, and rotates the lever 156 in a counterclockwise direction about a pivot 157. When the lever is thus rotated, another roller 158 secured between other bifurcations of the lower end of the lever engages a slide valve 160, and actuates the slide valve to the right against opposition of a spring 161, which normally urges the slide valve and body 152 to biased positions to the left and right, respectively.

Secured to and insulated from the lever 156 are two contacts 163 and 164, connected together by a connector 165. When the lever 156 is rotated in a counterclockwise direction by the body 152, the first contact 163 is actuated to disengage from a coacting stationary cut-off contact 166, while the other contact 164 is shortly thereafter actuated into engagement with stationary release contact 167. The two stationary contacts 166 and 167 are secured to and insulated from the retardation controller device casing by an insulating member 168.

Since the force of inertia resulting during deceleration of the vehicle or train is proportional to the rate of deceleration, it follows that the movement of body 152, and hence the degree of rotation of the lever 156 and the degree of movement of slide valve 160, are proportional to the rate of deceleration. The opening and closing of the contacts described and the control of communications by the slide valve 160 to be described later, may therefore be caused to take place at predetermined rates of deceleration.

The operation of this embodiment of my invention will now be described with reference to one car only, and it will hereinafter be pointed out how the adaptation to a train comprising more than one car may be effected.

*Running condition*

Figure 3:
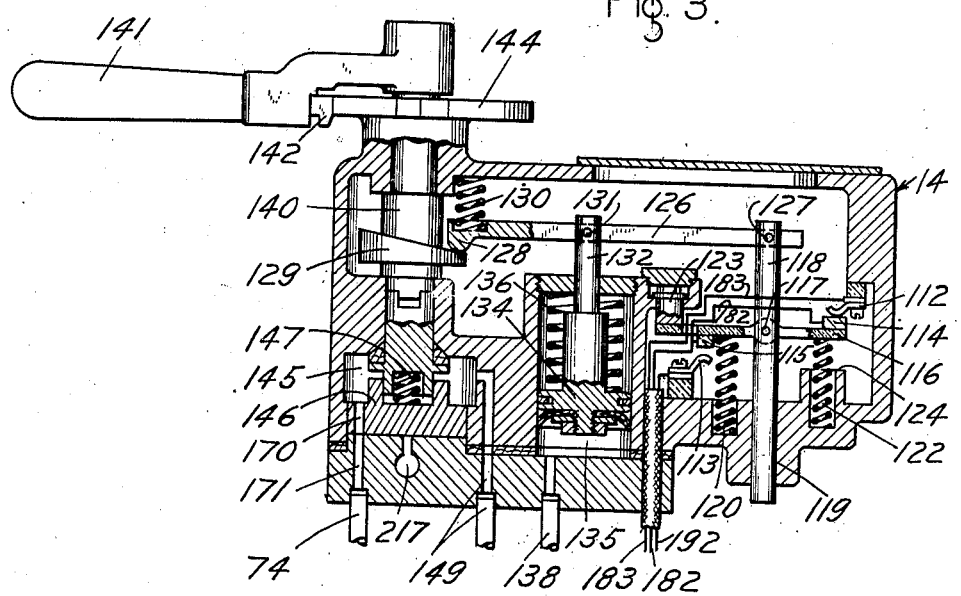
Figure 3 is a diagrammatic view of the brake valve device shown in Figure 1.

When the vehicle is running the handle 141 of the brake valve device 14 is maintained in release position. In this position the parts of the brake valve device will be in the positions shown in Figure 3.

In release position of the brake valve device, the rotary valve 146 connects the feed valve device 148 to the brake pipe 74, through a communication which includes, beginning at the feed valve device, pipe and passage 149, rotary valve chamber 145, rotary valve port 170, and passage 171 connecting with the brake pipe. The brake pipe will thus be maintained charged to feed valve pressure.

With the brake pipe thus maintained charged, the supply reservoir 38, the auxiliary reservoir 72, and the maintaining reservoir 106, will all be charged to brake pipe pressure. Communication from the brake pipe to the auxiliary reservoir 72 is by way of pipe and passage 75, triple valve piston chamber 64, feed groove 172, slide valve chamber 63, and pipe and passage 73. The supply reservoir is charged from the brake pipe by way of pipe and passage 75, chamber 64, past check valve 169, and passage 171, although it may also be charged from the auxiliary reservoir, by way of check valve device 173, which permits the flow of fluid from the auxiliary to the supply reservoir, but prevents flow in the opposite direction. The maintaining reservoir 106 is charged from the supply reservoir, by way of check valve device 174, which permits flow of fluid from the supply reservoir to the maintaining reservoir, but prevents flow in the reverse direction.

Figure 2:
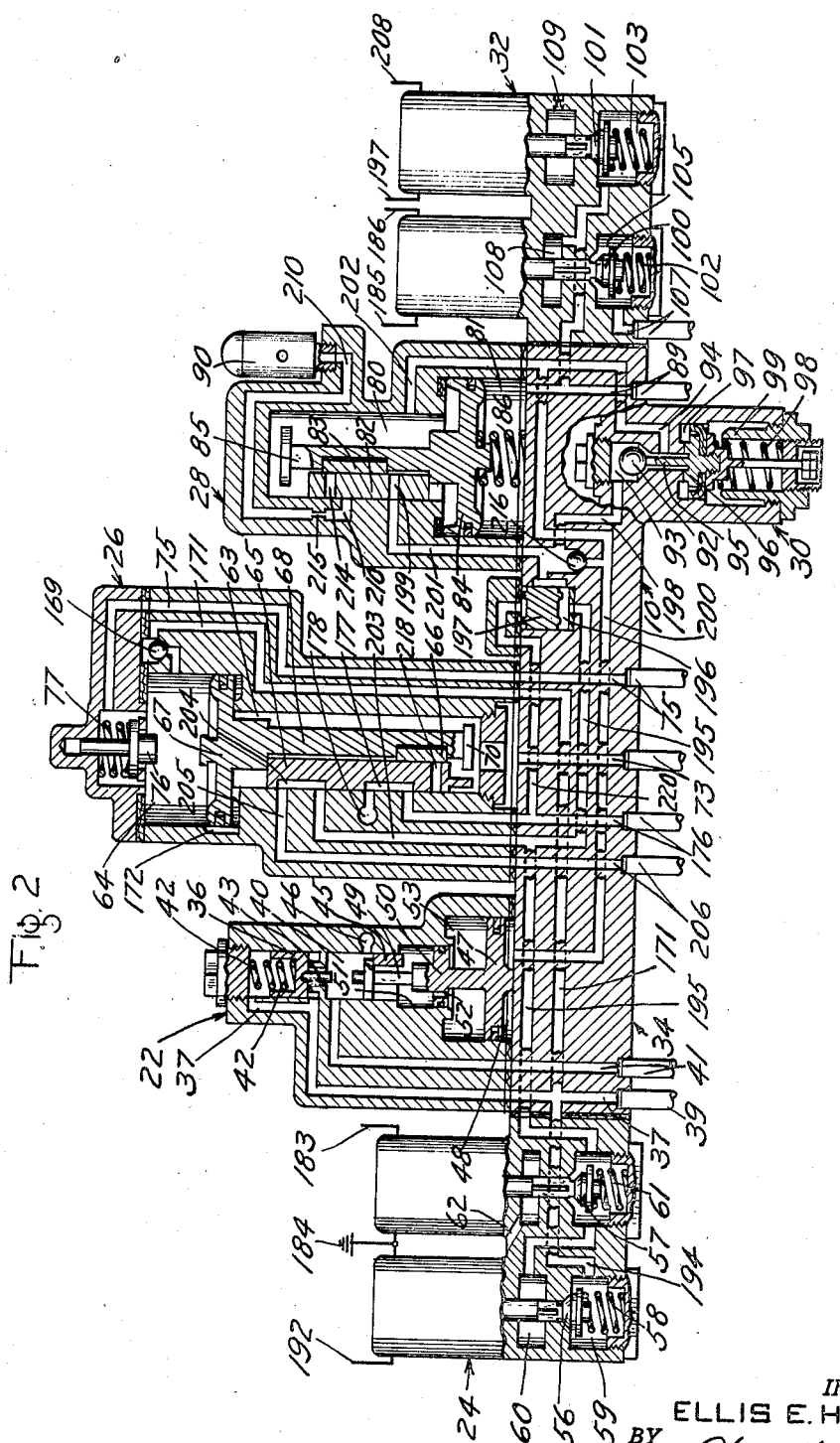
Figure 2 is a diagrammatic view of the control valve device shown in Figure 1.

With the brake pipe thus maintained charged, triple piston 67 will be in the lowermost position shown in Figure 2, where it will be noted that a volume reservoir 175 is connected to the atmosphere, by way of pipe and passage 176, cavity 177 of slide valve 65, and exhaust port 178.

In release position of the brake valve device 14, the movable release contact 114 engages stationary release contact 112, and as a result the electromagnet controlling the release valve 57 in the left hand magnet valve section 24, of the control valve device 10, will be energized from a battery 180 through a circuit which includes, beginning at the battery, conductors 181 and 182, contacts 112 and 114, and conductor 183, the return circuit to the battery being by way of ground connecting 184.

Figure 4:
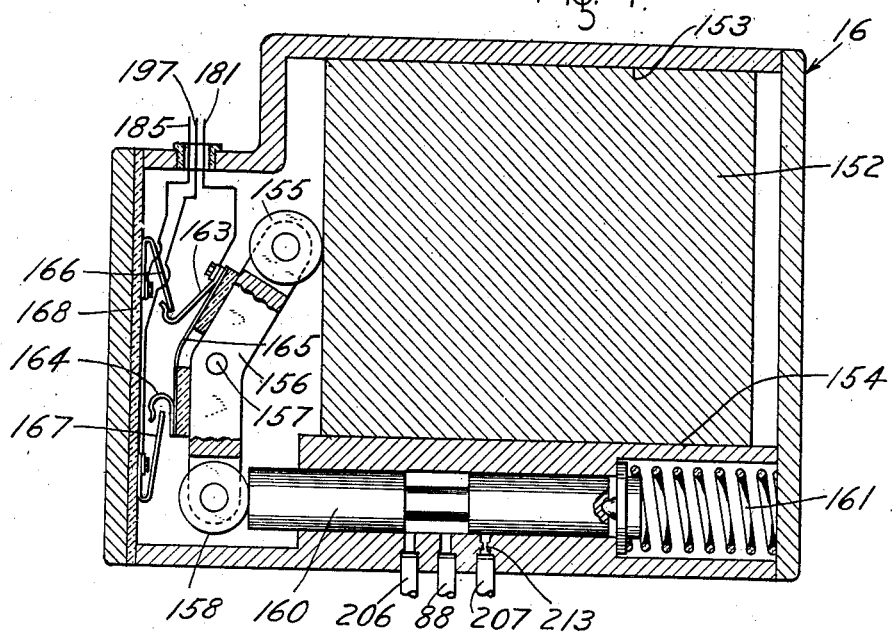
Figure 4 is a diagrammatic view of the retardation controller device shown in Figure 1.

In the retardation controller device 16, the body 152 will be substantially in the position shown in Figure 4, and contacts 163 and 166 will be in engagement. As a result, the electromagnet controlling the supply valve 100 in the right hand magnet valve section 32, of the control valve device 10, will be energized from the battery 180, through a circuit which, beginning at the battery, includes conductor 181, contacts 163 and 166, conductor 185, the electromagnet, conductor 186, jumper 187 at the rear end of the vehicle (or train), conductor 188, the winding of a relay 189, and ground connection 190.

Also, slide valve 160 of the retardation controller will maintain a communication between the maintaining reservoir 106 and piston chamber 81, by way of pipe 206, slide valve 160, pipe 88, and pipe and passage 89.

With the release valve 57 in the left hand magnet valve section 24 and supply valve 100 in the right hand magnet valve section 32 both unseated, and slide valve 160 in its biased position, the parts of the control valve device 10 will be in the positions shown in Figure 2. The relay valve section 22 will then hold the brake cylinder or brake cylinders 12 in communication with the atmosphere, and the brakes will be held released.

*Service application*

When it is desired to effect a service application of the brakes, the handle 141 of the brake valve device 14 is moved through the service zone to a degree in accordance with a desired degree of braking. This movement of the handle will rotate the cam 129, and as a result the left end 128 of the actuating lever 126 will be raised, the lever fulcruming about the pivot 131. Spring 136 may or may not be compressed, depending on the degree of movement of brake valve handle 141. The right end of the lever 126 thus actuates the plunger 118 downwardly to cause movable release contact 114 to disengage from stationary release contact 112, and to then cause movable application contact 115 to engage stationary application contact 113.

Disengagement of contacts 112 and 114 opens the circuit previously described to the electromagnet controlling release valve 57, and the release valve is then actuated to seated position by its spring 61.

Engagement of the two application contacts 113 and 115 causes energization of the electromagnet controlling the application valve 56, in the left hand magnet valve section 24 of the control valve device 10, from the battery 180, through a circuit which includes, beginning at the battery, conductors 181 and 182, contacts 113 and 115, and conductor 192, the return circuit to the battery being by way of the aforementioned ground connection 184. The application valve 56 is thus unseated, and fluid under pressure flows from the supply reservoir 38 to the relay piston chamber 48, through a communication which includes, beginning at the supply reservoir, pipe 39, passage 37, passage 194, past the unseated application valve 56, passage 195, and double check valve chamber 196, where double check valve 197 is actuated to the upper position.

From the double check valve chamber 196 the flow to the relay piston chamber 48 is through two branches, one branch leading by way of passage 198, the inshot ball valve chamber 93, past the unseated ball valve 92, to passage 94, and from thence to relay piston chamber 48, by way of passage 200. The other branch from the double check valve chamber 196 includes passage 201, slide valve port 199, slide valve chamber 80, and passage 202, which connects with the aforementioned passage 200 leading to piston chamber 48.

Relay piston 47 is actuated upwardly by the supply of fluid under pressure to chamber 48 and after a delayed movement it actuates slide valve 45 to blank exhaust port 46, and thereafter the upper end of stem 49 engages the valve stem 43 to unseat the valve 36. Fluid under pressure then flows from the supply reservoir 38 to the brake cylinder or brake cylinders 12, by way of pipe 39, passage 37, past the unseated valve 36, slide valve chamber 40 and pipe and passage 41.

As the pressure in relay piston chamber 48 builds up, a pressure will be reached where the inshot piston 96 will have been actuated downwardly far enough to seat the ball valve 92. Thereafter the flow of fluid from the double check valve chamber 196 to piston chamber 48 will be by way of the other communication described through the pneumatic cut-off and release valve section 28.

At the same time fluid under pressure flows to the relay piston chamber 48 it also flows to the straight air pipe 138, the communication including the aforementioned passage from the supply reservoir 38 to and including the passage 195, from whence the communication includes passage 203, cavity 204 in slide valve 65, passage 205, and pipe 206. Fluid under pressure in the straight air pipe flows to the piston chamber 135 in the brake valve device 14, where the piston 134 is actuated upwardly.

When the piston 134 has been actuated upwardly far enough to cause movable application contact 115 to disengage from stationary application contact 113, the electromagnet holding unseated the application valve 56, in the control valve device 10, will be deenergized and the flow of fluid from the supply reservoir 38 to the relay piston chamber 48, and straight air pipe 138, will be cut off when spring 58 seats the application valve 56.

The supply of fluid under pressure from the supply reservoir to the brake cylinder will continue until the pressure in relay valve chamber 53, above relay piston 47, is substantially the same as the pressure in piston chamber 48, whereupon the piston 47 will move downwardly until valve 36 is seated and the supply to the brake cylinder thus cut off. Slide valve 45 will continue to blank exhaust port 46, so that the supply to the brake cylinder will be lapped. The pressure at which the supply is lapped corresponds to the movement of the brake valve handle 141.

When the brake valve handle 141 is moved in the service zone, the brake pipe 74 is maintained connected to the feed valve device 148, through the port 170 in the rotary valve 146, so that the parts of the triple valve section 26 remain in the release position shown in Figure 2.

As the pressure of the fluid supplied to the brake cylinder or brake cylinders increases, the vehicle will begin to decelerate at an increasing rate. The body 152 in the retardation controller device 16 is then caused to move to the left. Assuming that the body 152 has been moved far enough for movable contact 163 to disengage from contact 166, then slide valve 160 will have been actuated to the right far enough to disconnect pipe 88 from pipe 206, but not far enough to connect pipe 88 with exhaust pipe 207.

Disengagement of contact 163 from contact 166 opens the circuit previously described to the electromagnet controlling the cut-off valve 100 in the right hand magnet valve section 32, and this valve is seated by its spring 102. Disconnecting pipe 88 from pipe 206 closes the communication previously described between the maintaining reservoir 106 and piston chamber 81, through the retardation controller device, so that both the communication by way of the retardation controller device and that by way of the right hand magnet valve device 32, from the maintaining reservoir to piston chamber 81, are closed.

If now the retardation controller body 152 moves to the left far enough to cause engagement of contacts 164 and 167, then slide valve 160 will have been actuated far enough to the right to bring pipe 88 into communication with exhaust pipe 207.

Engagement of contacts 164 and 167 energizes the electromagnet controlling the release valve 101, in the right hand magnet valve section 32, from battery 180 through a circuit which, beginning at the battery, includes conductor 181, connector 165, contacts 164 and 167, conductor 197, the electromagnet, conductor 208, jumper 209 at the end of the vehicle (or train), conductor 210, a winding of relay 211, and ground connection 212.

As a result of energizing this electromagnet release valve 101 will be unseated to establish a communication between piston chamber 81 and the atmosphere, by way of restricted port 109, which restricts the rate of release. When the retardation controller slide valve 116 connects pipe 88 with exhaust pipe 207, a second communication between the piston chamber 81 and the atmosphere is established, by way of pipe and passage 89, pipe 88, slide valve 160, and exhaust pipe 207, which has a restriction 213 therein to also restrict the rate of release. It will thus be seen that two communications are established between piston chamber 81 and the atmosphere, and that even though the means controlling one of these communications should fail the other communication will be adequate to release fluid under pressure from the piston chamber.

As fluid is released from piston chamber 81, the pressure in the chamber reduces and piston 84 moves downwardly, first to the position where slide valve 83 blanks port 199, and if the release is great enough then to the position where slide valve 82 blanks passage 201 and slide valve port 214 registers with passage 210. In the first case the supply to relay piston chamber 48 is lapped, while in the second case fluid under pressure is released from the relay piston chamber to the atmosphere, by way of passages 200 and 202, slide valve chamber 80, port 214, passage 210, which contains a restriction 215, and safety valve device 90.

Assuming that fluid is released from the relay piston chamber 48, the consequent drop in pressure permits piston 47 to move downwardly far enough for slide valve 45 to uncover exhaust port 46. Fluid under pressure is thus released from the brake cylinder, and as a consequence the rate of retardation diminishes and retardation controller body 152 moves toward the right.

When the body 152 has moved far enough to the right for contact 164 to disengage from contact 167, and for slide valve 160 to blank exhaust pipe 207, the venting of piston chamber 81 will be terminated. As soon as the pressure in relay piston chamber 48, and slide valve chamber 80, drops by a sufficient amount spring 86 will actuate piston 84 upwardly far enough for graduating valve 83 to blank port 214. Relay piston 47 will then move to lap position, where slide valve 45 blanks exhaust port 46.

If the rate of retardation should then again increase so that body 152 is again moved to the left, the cycle just described will be repeated. Regardless however of how many times the cycle may be repeated, the release of fluid from relay piston chamber 48 will be terminated by the safety valve device 90 when the pressure of the fluid has as a consequence of the release dropped below a predetermined value, corresponding to the setting of the safety valve device.

To effect a release of the brakes at any time, the operator moves the brake valve handle 141 to release position. In this position the parts of the brake valve device assume the positions shown in Figure 3, where the electromagnet controlling release valve 57 is again energized, and fluid under pressure is released from relay piston chamber 48 to the atmosphere, through a communication including passage 200, ball check valve 216, which will unseat, double check valve chamber 196, passage 195, past the unseated release valve 57, and through exhaust port 62. It is to be noted that this release may be effected regardless of the position of the slide valve 82 in the pneumatic cut-off and release valve section 28, although if port 199 in slide valve 82 is in registration with passage 201, the release may be also effected through this communication.

Emergency application

When it is desired to effect an emergency application of the brakes, the handle 141 of the brake valve device 14 is moved to emergency position, where the contacts of the brake valve device are operated the same as described for a service application, except that spring 136 is now compressed to a maximum degree, and where, in addition, the rotary valve 146 disconnects the brake pipe 74 from the rotary valve chamber 145 and reconnects the brake pipe to the atmosphere by way of exhaust port 217. The brake pipe is thus vented to the atmosphere to reduce brake pipe pressure in the manner commonly employed in automatic brake systems.

As a consequence of operation of the contacts in the brake valve device, fluid under pressure will be supplied from supply reservoir 38 to the double check valve chamber 196 to a maximum degree. At the same time, the reduction in brake pipe pressure will cause triple piston 67 to move to its extreme uppermost position, where graduating spring 77 is compressed.

Triple slide valve 65 will then disconnect volume reservoir 175 from exhaust port 178, and will at the same time uncover passage 176, which leads to both the volume reservoir 175 and the double check valve chamber 196, the communication to the double check valve chamber being by way of branch passage 220. Fluid under pressure will then flow from the auxiliary reservoir 72 to the double check valve chamber 196 also to a maximum degree, through a communication including pipe and passage 73, slide valve chamber 63, passages 176 and 220.

It will thus be seen that fluid under pressure will be supplied to double check valve chamber 196, above double check valve 197, from the auxiliary reservoir, while fluid will be also supplied from the supply reservoir to the underside of double check valve 197. The fluid which predominates in pressure will therefore urge the double check valve 197 to one side and will then flow through the communication before described to the relay piston chamber 48. Thereafter the funtioning of the parts will be as described for a service application.

The retardation controller device 16 and the pneumatic cut-off and release valve section 28 will thus be seen to control both service and emergency applications so as to prevent the rate of retardation from exceeding a chosen value.

To effect a release of the brakes following an emergency application, the brake valve handle 141 is turned back to release position, where the brake pipe 74 is again connected to the feed valve device 148, and pressure in the brake pipe restored. Triple piston 67 will then be actuated to its lowermost position, where volume reservoir 175 is again connected to discharge port 178 by cavity 177. At the same time, application valve 56 will be seated and release valve 57 unseated, so that fluid under pressure will be released from relay piston chamber 48, as before described.

The purpose of providing the volume reservoir 175 is to add additional volume to relay piston chamber 48. If this additional volume were not provided, a light reduction in brake pipe pressure would cause a heavy application of the brakes. Therefore, in order that the brake application for a given brake pipe reduction shall correspond very nearly to that effected for a similar application in standard brake systems, additional volume must be added to the system.

Auxiliary service application

If for any reason the electropneumatic, or straight air, portion of the equipment described should be rendered inoperative, a service application of the brakes may be effected by automatic operation. The brake valve handle 141 is then turned to emergency position and left in this position only long enough to vent the brake pipe according to the degree of brake application desired. Thereafter, the brake valve handle is turned to lap position. Triple piston 67 will be then actuated upwardly until it engages graduating stop 76, where slide valve 65 brings its port 218 in registration with passage 176, and graduating valve 66 uncovers the port 218. Fluid under pressure will then be supplied from the auxiliary reservoir to the relay piston chamber 48 until equalization takes place on either side of triple piston 67, whereupon the piston will move downwardly to the position where graduating valve 66 blanks port 218. The supply of fluid to the brake cylinder by the relay valve section 22 will then be lapped as a result.

While the retardation controller device and pneumatic cut-off and release valve section 28 are operable to control such auxiliary service applications, such applications will in general be to a degree below that required to produce the maximum rate of retardation. If however the rate of retardation should increase to the point where the retardation controller device effects operation of the pneumatic cut-off and release valve section 28, the functioning will be as before described for a service application.

A release of the brakes may be effected following an auxiliary service application in the same manner as effected following an emergency application.

Operation of indicating means

When the retardation controller device 16 has functioned to disengage contact 163 from contact 166, and thereby deenergize the electromagnet controlling cut-off valve 100, the relay 189, connected in series with this electromagnet, will also be deenergized. The relay 189 thereupon opens its contact 222 to deenergize indicating device 18. The operator is therefore informed that the cut-off valve 100 is seated.

When contact 164 engages contact 167, of the retardation controller 16, relay 211 will be energized in series with the electromagnet controlling the release valve 101. Relay 211 then closes its contacts 223 to energize indicating device 20. The operator is then informed that release valve 101 is unseated.

As the retardation controller device reverses this operation of its contacts, the signaling devices 20 and 18 will be deenergized and energized, respectively, to indicate to the operator the functioning of the release and cut-off valves aforementioned.

It is to be noted that the two relays 189 and 211 are each connected to their associated electromagnet through circuits which extend to the end of the vehicle, or to the end of a train in the case of a number of cars, and then back to the head end car, so that these control circuits are checked by the indicating devices, that is to say, the indicating devices indicate whether or not the retardation control circuits are intact, and as a consequence whether or not devices connected in these circuits are energized or deenergized.

In adapting the embodiment described to a train comprising a number of cars, it will be readily apparent that only the control valve device 19, and the reservoirs and brake cylinder connected thereto, need be supplied on other than the head end or control car.

While I have described my invention with respect to one embodiment, it is to be understood that I do not intend to be limited to this embodiment or otherwise than by the spirit and scope of the appended claims.

Having now described my invention, what I claim as new and desire to secure by Letters Patent, is:

1. In a vehicle brake system, in combination, a brake cylinder, relay valve means for supplying fluid under pressure to the brake cylinder, a valve device operated upon a decrease in pressure to effect operation of said relay valve means to release fluid under pressure from the brake cylinder, a retardation controller device operated according to the rate of retardation of the vehicle, and means responsive to operation of said retardation controller device at a predetermined rate of retardation for decreasing the pressure in said valve device.

2. In a vehicle brake system, in combination, a brake cylinder, means for supplying fluid under pressure to the brake cylinder, a valve device having a chamber normally charged with fluid under pressure and operable upon a decrease of pressure in said chamber for effecting a release of fluid under pressure from the brake cylinder, a first valve operable to decrease the pressure in said chamber, a second valve also operable to decrease the pressure in said chamber, and means responsive to operation of said retardation controller device for controlling both of said valves.

3. In a vehicle brake system, in combination, a brake cylinder, means for supplying fluid under pressure to the brake cylinder, releasing means operable to effect a release of fluid under pressure from the brake cylinder, a first valve having a biased position and operable to another position to cause said releasing means to effect a release of fluid under pressure from the brake cylinder, a second valve also having a biased position and operable to another position to also cause said release means to effect a release of fluid under pressure from the brake cylinder, and means operated according to the rate of retardation of the vehicle for controlling said two valves.

4. In a vehicle brake system, in combination, a brake cylinder, means for supplying fluid under pressure to the brake cylinder, a valve device having a chamber normally charged with fluid under pressure and operated upon a decrease of pressure in said chamber to effect a release of fluid under pressure from the brake cylinder, means for establishing a communication from said chamber to the atmosphere, a first valve controlling said communication, means for establishing a second communication from said chamber to the atmosphere, an electrically operated valve device for controlling said second communication, a retardation controller device operated according to the rate of retardation of the vehicle, and means for effecting operation of said two valves to open both of said communications in response to operation of said retardation controller device at a chosen rate of retardation.

5. In a vehicle brake system, in combination, a brake cylinder, means for supplying fluid under pressure to the brake cylinder, a valve device having a chamber and operable upon a decrease of pressure in said chamber to effect a release of fluid under pressure from the brake cylinder, a normally charged reservoir, means for establishing two different communications from said reservoir to said chamber, a first valve controlling one of said communications, a second valve controlling the other of said communications, a retardation controller device operated according to the rate of retardation of the vehicle, and means responsive to operation of said retardation controller device at a chosen rate of retardation for actuating both of said valves to close both of said communications.

6. In a vehicle brake system, in combination, a brake cylinder, means for supplying fluid under pressure to the brake cylinder, a valve device having a chamber and operable upon a decrease of pressure in said chamber to effect a release of fluid under pressure from the brake cylinder, a normally charged reservoir, means for establishing two different communications between said reservoir and said chamber, a first valve normally opening one of said communications and mechanically operable to close said one communication, a second valve device normally opening said second communication and operable electrically to close said second communication, a retardation controller device operated according to the rate of retardation of the vehicle, and means responsive to operation of said retardation controller device at a chosen rate of retardation for effecting closing of both of said valves.

7. In a vehicle brake system, in combination, a brake cylinder, means for supplying fluid under pressure to the brake cylinder, a valve device having a chamber and being operable upon a decrease of pressure in said chamber to effect a release of fluid under pressure from the brake cylinder, a normally charged reservoir, means for establishing two different communications from said reservoir to said chamber, a first valve controlling one communication, a second valve controlling the other communication, means for establishing two other and different communications for releasing fluid under pressure from said chamber, valve means controlling said two release communications, a retardation controller device operated according to the rate of retardation of the vehicle, means responsive to operation of said retardation controller device at one rate of retardation for causing said first and second valves to close said first two communications, and means responsive to operation of said retardation controller device at a higher rate of retardation for causing said valve means to open said two release communications.

8. In a vehicle brake system, in combination, a brake cylinder, means for supplying fluid under pressure to the brake cylinder, a valve device having a piston subject on one side to pressure from a chamber and operable upon a decrease of pressure in said chamber to effect a release of fluid under pressure from the brake cylinder, a normally charged reservoir, means for establishing a first communication from said reservoir to said chamber, a valve having two operative positions and operable in the first of said positions to close said first communication, means for establishing a second communication from said reservoir to said chamber, an electrically operated valve device operable to close said second communication, means for establishing a third communication through which fluid under pressure is released from said chamber, a second electrically operated valve device operable to open said third communication, means operable when said first mentioned valve is in said second operative position to establish a fourth communication from said chamber to the atmosphere, and a retardation controller device for controlling said first mentioned valve and said two electrically operated valve devices.

9. In a vehicle brake system, in combination, a brake cylinder, means for supplying fluid under pressure to the brake cylinder either by straight air operation or by automatic operation, a valve device operable to effect a release of fluid under pressure from the brake cylinder whether supplied by straight air operation or by automatic operation, means for establishing a first control communication, means for establishing a second control communication, means for maintaining said two control communications charged with fluid under pressure, means operable upon the decrease of pressure of fluid in said two control communications for causing said valve device to operate to effect a release of fluid under pressure from the brake cylinder, and means operated according to the rate of retardation of the vehicle for controlling the pressure of fluid in said two control communications.

10. In a vehicle brake system, in combination, a brake cylinder, means for supplying fluid under pressure to the brake cylinder either by straight air operation or by automatic operation, means for establishing a first control communication, means for establishing a second control communication, a valve device operable only upon decrease of pressure in both of said communications for effecting a release of fluid under pressure from the brake cylinder, means for supplying fluid under pressure to both of said communications to maintain said communications charged, a valve having a first operative position in which the supply to one communication is cut off and a second operative position in which fluid under pressure is released from that communication, two electrically operated valve devices one of which is operable to cut off the supply to the second control communication and the other of which is operable to release fluid under pressure from said second communication, and means operated according to the rate of retardation of the vehicle for controlling said valve and said two electrically operated valve devices.

11. In a vehicle brake system, in combination, a brake cylinder, a relay valve device operable to control the supply of fluid under pressure to and its release from said brake cylinder according to the pressure of fluid supplied to said relay valve device, means for establishing a communication through which fluid under pressure is supplied to operate said relay valve device, means for supplying fluid under pressure to said communication either by straight air operation or by automatic operation, a valve device normally maintaining said communication open and operable to close said communication to either of said supplies and to vent said communication to the atmosphere, two control communications, means for maintaining said two control communications charged with fluid under pressure, a valve operable to reduce the pressure of fluid in one of said control communications, electroresponsive valve means operable to reduce the pressure of fluid in the other of said control communications, means whereby a reduction of pressure of fluid in both of said control communications effects operation of said valve device to close said first communication and to vent said first communication to the atmosphere, an element having a normally biased position and operable to one or more control positions, means for controlling said valve and electroresponsive valve means according to position of said element, and means for operating said element according to the rate of retardation of the vehicle.

12. In a vehicle brake system, in combination, a brake cylinder, a relay valve device operable to control the supply of fluid under pressure to and its release from the brake cylinder, means for establishing a first communication through which fluid under pressure is supplied to operate the relay valve device, means for supplying fluid under pressure to said first communication, means for establishing a second communication leading to the atmosphere, a valve device normally maintaining said first communication open to said supply and operable to close said first communication to said supply and to connect said first communication to said second communication, a retardation controller device having a normally closed contact and a normally open contact, means responsive to opening of said normally closed contact and closing of said normally open contact for causing said valve device to operate to first close said first communication to said supply and to then connect said first communication to said second communication.

13. In a vehicle brake system, in combination, a brake cylinder, a relay valve device for controlling the supply of fluid under pressure to and its release from the brake cylinder, means for establishing a communication through which fluid under pressure is supplied to operate the relay valve device, a second valve device controlling said communication and operable upon a decrease in pressure to close said communication, means for establishing a by-pass communication around said second valve device, a third valve device operated upon a predetermined increase in pressure for closing said by-pass communication, and means governed by the rate of retardation of the vehicle for controlling operation of said second valve device.

14. In a vehicle brake system, in combination, a brake cylinder, means for supplying fluid under pressure to the brake cylinder, two control communications, means for maintaining said two control communications charged with fluid under pressure, a valve operable to a first position to close one of said control communications to said charging means and operable to a second position to reduce the pressure in that control communication, a normally energized magnet valve device operable when deenergized to close the other of said two control communications to said charging means, a normally deenergized second magnet valve device operable when energized to reduce the pressure in said second control communication, a valve device responsive to pressure of fluid in said two control communications and operable upon a decrease in pressure of fluid in both of said control communications for effecting a release of fluid under pressure from the brake cylinder, and means operated according to the rate of retardation of the vehicle for controlling said valve and energization of said two magnet valve devices.

15. In a vehicle brake system, in combination, a brake cylinder, means for supplying fluid under pressure to the brake cylinder, a valve device having a piston subject on one side to pressure from a chamber and on the other side to pressure corresponding to brake cylinder pressure and operable upon a decrease of pressure in said chamber to release fluid under pressure from the brake cylinder, means for supplying fluid under pressure to said chamber through a plurality of communications, a retardation controller device having normally closed contacts adapted to be opened at one rate of retardation and normally open contacts adapted to be closed at a higher rate of retardation, means responsive to opening of said normally closed contacts for closing one of said communications to said chamber, and means responsive to closing of said normally open contacts for establishing a communication between said chamber and the atmosphere.

16. In a train brake system, in combination, a brake cylinder for each car in the train, a supply reservoir for each car in the train, means for each car in the train for controlling the supply of fluid under pressure from a supply reservoir to a brake cylinder on that car, a retardation controller device operated according to the rate of retardation of the train for the head end car, means including two magnet valve devices for each car in the train for controlling the release of fluid under pressure from the brake cylinder on that car, circuits extending from said retardation controller device on the head end car to the rear car in the train and then back to the head end car, the magnet valve devices on each car being connected in said circuits, and indicating means on the head end car associated with each of said circuits and operable to indicate when said circuits are energized and deenergized.

17. In a train brake system, in combination, a brake cylinder, a control valve device for controlling the supply of fluid under pressure to and its release from said brake cylinder, said control valve device having a plurality of magnet valve devices associated therewith for controlling the pressure of fluid supplied to said brake cylinder, a retardation controller device having contacts operated at chosen rates of retardation, a plurality of indicating devices, and circuits for connecting each of said magnet valve devices in series with a different one of said indicating devices and to said contacts.

18. In a vehicle brake system, in combination, a brake cylinder, a control valve device for controlling the supply of fluid under pressure to and its release from said brake cylinder, said control valve device having two magnet valve devices for controlling the release of fluid under pressure from the brake cylinder, a retardation controller device having contacts operable at different rates of retardation, a plurality of relays, circuits for connecting each of said magnet valve devices in series with one of said relays and to said contacts, and indicating means controlled by said two relays.

ELLIS E. HEWITT.